(12) United States Patent
Parian et al.

(10) Patent No.: US 12,299,926 B2
(45) Date of Patent: May 13, 2025

(54) TRACKING WITH REFERENCE TO A WORLD COORDINATE SYSTEM

(71) Applicant: FARO Technologies, Inc., Lake Mary, FL (US)

(72) Inventors: Jafar Amiri Parian, Schlieren (CH); Robert E. Bridges, Kennett Square, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 407 days.

(21) Appl. No.: 17/845,482

(22) Filed: Jun. 21, 2022

(65) Prior Publication Data

US 2022/0414925 A1    Dec. 29, 2022

Related U.S. Application Data

(60) Provisional application No. 63/314,027, filed on Feb. 25, 2022, provisional application No. 63/215,126, filed on Jun. 25, 2021.

(51) Int. Cl.
*G06T 7/00* (2017.01)
*G01C 11/06* (2006.01)
(Continued)

(52) U.S. Cl.
CPC ............ *G06T 7/74* (2017.01); *G01C 11/06* (2013.01); *G01S 17/894* (2020.01); *G06T 7/97* (2017.01);
(Continued)

(58) Field of Classification Search
None
See application file for complete search history.

(56) References Cited

U.S. PATENT DOCUMENTS

| 8,705,012 B2 | 4/2014 | Greiner et al. |
| 10,597,753 B2 | 3/2020 | Willcox et al. |

(Continued)

FOREIGN PATENT DOCUMENTS

WO    2021/188741 A1    9/2021

OTHER PUBLICATIONS

Li et al., Camera localization for augmented reality and indoor positioning: a vision-based 3D feature database approach. Int. J. Digital Earth. Jan. 2019; 13(6):15 pages.

(Continued)

*Primary Examiner* — Martin Mushambo
(74) *Attorney, Agent, or Firm* — McCarter & English, LLP

(57) ABSTRACT

Examples described herein provide a method that includes capturing data about an environment. The method further includes generating a database of two-dimensional (2D) features and associated three-dimensional (3D) coordinates based at least in part on the data about the environment. The method further includes determining a position (x, y, z) and an orientation (pitch, roll, yaw) of a device within the environment based at least in part on the database of 2D features and associated 3D coordinates. The method further includes causing the device to display, on a display of the device, an augmented reality element at a predetermined location based at least in part on the position and the orientation of the device.

21 Claims, 16 Drawing Sheets
(8 of 16 Drawing Sheet(s) Filed in Color)

(51) Int. Cl.
*G01S 17/894* (2020.01)
*G06T 7/73* (2017.01)
*G06T 11/00* (2006.01)
*G06T 19/00* (2011.01)
*G06V 10/22* (2022.01)
*G06V 10/74* (2022.01)

(52) U.S. Cl.
CPC ............ *G06T 11/00* (2013.01); *G06T 19/006* (2013.01); *G06V 10/22* (2022.01); *G06V 10/761* (2022.01); *G06T 2207/10028* (2013.01); *G06T 2207/30244* (2013.01); *G06T 2210/56* (2013.01)

(56) References Cited

U.S. PATENT DOCUMENTS

| | | |
|---|---|---|
| 2012/0306850 A1 | 12/2012 | Balan et al. |
| 2019/0219409 A1* | 7/2019 | Tan ................... G05B 19/048 |
| 2019/0257642 A1 | 8/2019 | Hillebrand |
| 2020/0250889 A1* | 8/2020 | Li ......................... G06T 7/246 |
| 2021/0209856 A1 | 7/2021 | Liukkonen et al. |

OTHER PUBLICATIONS

International Search Report and Written Opinion for Application No. PCT/US2022/048402, dated Apr. 14, 2023, 21 pages.

Horn; "Relative Orientation"; Massachusetts Institute of Technology; The Artificial Intelligence Laboratory, A.I. Memo No. 994-A; Sep. 1978, Revised Mar. 1989; 38 Pages.

Zeng et al.; "A General Solution of a Closed-Form Space Resection"; American Society for Photogrammetry and Remote Sensing; Photogrammetric Engineering & Remote Sensing; vol. 58, No. 3; Mar. 1992; pp. 327-338.

Cairo University, Week 7: Feature Extraction, Description and, matching. Retrieved online at: https://sbme-tutorials.github.io/2019/cv/notes/7_week7.html. 5 pages, (2019).

Douze et al., Faiss. Retrieved online at: https://github.com/facebookresearch/faiss. 3 pages, (2023).

Lee et al., A Proposed Interim Check for Field Testing a Laser Tracker's 3-D Length Measurement Capability Using a Calibrated Scale Bar as a Reference Artifact. NIST, National Institute of Standards and Technology. NISTIR 8016, retrieved online at: http://dx.doi.org/10.6028/NIST.IR.8016. 14 pages, Sep. 2014.

Malkov et al., Hnswlib—fast approximate nearest neighbor search. Retrieved online at: https://github.com/nmslib/hnswlib. 11 page, Feb. 5, 2023.

Muja et al., FLANN—Fast Library for Approximate Nearest Neighbors. Retrieved online at: https://github.com/flann-lib/flann. 2 pages, Oct. 27, 2022.

Wikipedia, k-nearest neighbors algorithm. Retrieved online at: https://en.wikipedia.org/wiki/K-nearest_neighbors_algorithm. 11 pages, Sep. 2023.

* cited by examiner

520

| | Point ID | X[mm] | Y[mm] | Z [mm] |
|---|---|---|---|---|
| 1 | ;0 | 1364.726 | -241.780 | -619.995 |
| 2 | ;1 | 1363.481 | -42.077 | -559.617 |
| 3 | ;2 | 1364.181 | 219.935 | -354.152 |
| 4 | ;3 | 1425.899 | 640.654 | -998.593 |
| 5 | ;4 | 1458.701 | 735.132 | -1067.280 |
| 6 | ;5 | 1364.806 | 976.036 | 271.022 |
| 7 | ;6 | 1364.945 | 949.920 | 225.219 |
| 8 | ;7 | 1365.265 | 1063.758 | 343.200 |
| 9 | ;8 | 1363.351 | -48.805 | -539.322 |
| 10 | ;9 | 1365.305 | 1187.344 | 402.793 |
| 11 | ;10 | 1365.347 | 1177.769 | 411.996 |
| 12 | ;11 | -1262.272 | -1096.186 | -368.253 |
| 13 | ;12 | -1262.258 | -1112.281 | -205.939 |
| 14 | ;13 | -1261.116 | -1124.934 | -20.904 |
| 15 | ;14 | -1267.711 | -1157.284 | 883.396 |
| 16 | ;15 | -1254.940 | -1023.597 | 103.214 |
| 17 | ;16 | -1257.516 | -795.208 | -302.867 |
| 18 | ;17 | -1252.560 | -813.137 | 7.645 |
| 19 | ;18 | -1250.665 | -725.590 | -44.718 |
| 20 | ;19 | -1263.156 | 276.184 | -983.507 |
| 21 | ;20 | -1263.994 | 295.260 | -1027.949 |
| 22 | ;21 | -1256.531 | 386.624 | -766.331 |

*FIG. 5C*

TRACKING WITH REFERENCE TO A WORLD COORDINATE SYSTEM

CROSS-REFERENCE TO RELATED APPLICATIONS

This application claims the benefit of U.S. Provisional Patent Application No. 63/314,027 filed Feb. 25, 2022 and U.S. Provisional Patent Application No. 63/215,126 filed Jun. 25, 2021, the disclosures of which are incorporated herein by reference in their entirety.

BACKGROUND

The subject matter disclosed herein relates to tracking within an environment and, in particular, to tracking with reference to a world coordinate system.

Augmented reality (AR) provides for enhancing the real physical world by delivering digital visual elements, sound, or other sensory stimuli (an "AR element") via technology. For example, a user device (e.g., a smartphone, tablet computer, etc.) equipped with a camera and display can be used to capture an image of an environment. In some cases, this includes using the camera to capture a live, real-time representation of an environment and displaying that representation on the display. An AR element can be displayed on the display and can be associated with an object/feature of the environment. For example, an AR element with information about how to operate a particular piece of equipment can be associated with that piece of equipment and can be digitally displayed on the display of the user device when the user device's camera captures the environment and displays it on the display. It is useful to know the location of the user device relative to the environment in order to accurately depict AR elements.

Accordingly, while existing AR systems are suitable for their intended purposes, the need for improvements remains, particularly in tracking the location of the user device relative to the environment.

BRIEF DESCRIPTION

In one exemplary embodiment, a method is provided. The method includes capturing data about an environment. The method further includes generating a database of two-dimensional (2D) features and associated three-dimensional (3D) coordinates based at least in part on the data about the environment. The method further includes determining a position (x, y, z) and an orientation (pitch, roll, yaw) of a device within the environment based at least in part on the database of 2D features and associated 3D coordinates. The method further includes causing the device to display, on a display of the device, an augmented reality element at a predetermined location based at least in part on the position and the orientation of the device.

In addition to one or more of the features described herein, or as an alternative, further embodiments of the method may include that the data about the environment includes at least two images.

In addition to one or more of the features described herein, or as an alternative, further embodiments of the method may include that generating the database of 2D features and associated 3D coordinates includes performing photogrammetry using the at least two images.

In addition to one or more of the features described herein, or as an alternative, further embodiments of the method may include that generating the database of 2D features and associated 3D coordinates includes performing photogrammetry using at least one image.

In addition to one or more of the features described herein, or as an alternative, further embodiments of the method may include that the data about the environment is captured using a camera.

In addition to one or more of the features described herein, or as an alternative, further embodiments of the method may include that the data about the environment includes a point cloud.

In addition to one or more of the features described herein, or as an alternative, further embodiments of the method may include that the data about the environment is captured using a three-dimensional scanner.

In addition to one or more of the features described herein, or as an alternative, further embodiments of the method may include that the data about the environment includes at least one image captured using a camera and a point cloud captured using a three-dimensional scanner.

In addition to one or more of the features described herein, or as an alternative, further embodiments of the method may include that generating the database of 2D features and associated 3D coordinates includes: performing feature extraction; determining a first 3D coordinate for a first feature of a plurality of features using a laser scan; and responsive to determining that a second 3D coordinate cannot be determined for a second feature of the plurality of features using the laser scan, determining the second 3D coordinate for the second feature of the plurality of features using photogrammetry.

In addition to one or more of the features described herein, or as an alternative, further embodiments of the method may include that generating the database of 2D features and associated 3D coordinates includes performing feature extraction on the data about the environment.

In addition to one or more of the features described herein, or as an alternative, further embodiments of the method may include that performing the feature extraction is based at least in part on an intensity image, a color image, or lidar depth data.

In addition to one or more of the features described herein, or as an alternative, further embodiments of the method may include that generating the database of 2D features and associated 3D coordinates further includes, subsequent to performing the feature extraction, using an extracted feature to estimate a 3D coordinate for the extracted feature.

In addition to one or more of the features described herein, or as an alternative, further embodiments of the method may include that determining the position and the orientation of the device within the environment includes: receiving an image of the environment from the device; extracting a 2D feature from the image; and comparing the 2D feature to data stored in the database of 2D features and associated 3D coordinates to determine whether a match exists.

In addition to one or more of the features described herein, or as an alternative, further embodiments of the method may include that determining the position and the orientation of the device within the environment includes: responsive to determine that a match exists, creating a 3D reference point used for tracking using a 3D coordinate stored in the database of 2D features and associated 3D coordinates that is associated with the match; and determining the position and the orientation of the device to track the device in the environment.

In addition to one or more of the features described herein, or as an alternative, further embodiments of the method may include that the position and the orientation of the device within the environment is determined using at least one of relative orientation or space resection.

In addition to one or more of the features described herein, or as an alternative, further embodiments of the method may include that determining the position and the orientation of the device within the environment includes: responsive to determine that a match does not exist, restarting the method.

In addition to one or more of the features described herein, or as an alternative, further embodiments of the method may include identifying a difference between a feature captured by the device and a feature of the database of 2D features and associated 3D coordinates to identify a changed region within the environment, and updating the database of 2D features and associated 3D coordinates based at least in part on the difference.

In addition to one or more of the features described herein, or as an alternative, further embodiments of the method may include detecting a fiducial feature within the environment, determining an expected location of the fiducial feature within the environment based at least in part on the database of 2D features and associated 3D coordinates, and determining whether an actual location of the fiducial feature matches the expected location of the fiducial feature.

In another exemplary embodiment a system includes a scanner to capture data about an environment. The system further includes a scanner to capture data about an environment. The system further includes a processing system having first processing circuitry. The first processing circuitry can generate a database of 2D features and associated 3D coordinates based at least in part on the data about the environment. Further, the first processing circuitry can determine a position and an orientation of a user device within the environment based at least in part on the database of 2D features and associated 3D coordinates. The system further includes the user device including a display and second processing circuitry. The second processing circuitry can display, on the display, an augmented reality element at a predetermined location based at least in part on the position and the orientation of the user device.

In addition to one or more of the features described herein, or as an alternative, further embodiments of the method may include that determining the position and the orientation of the user device is further based at least in part on an image captured by a camera associated with the user device.

In addition to one or more of the features described herein, or as an alternative, further embodiments of the method may include that the data about the environment are images of the environment, and wherein generating the database of 2D features and associated 3D coordinates based at least in part on the data about the environment is performed using photogrammetry.

In addition to one or more of the features described herein, or as an alternative, further embodiments of the method may include that generating the database of 2D features and associated 3D coordinates based at least in part on the data about the environment includes performing feature extraction.

In addition to one or more of the features described herein, or as an alternative, further embodiments of the method may include that the data about the environment is captured using a three-dimensional scanner.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF DRAWINGS

The patent or application file contains at least one drawing executed in color. Copies of this patent or patent application publication with color drawing(s) will be provided by the Office upon request and payment of the necessary fee.

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 5C depicts a table of the extracted features from FIG. 5B according to one or more embodiments described herein;

The detailed description explains embodiments of the disclosure, together with advantages and features, by way of example with reference to the drawings.

DETAILED DESCRIPTION

As described herein, augmented reality (AR) provides for enhancing the real physical world by delivering digital visual elements, sound, or other sensory stimuli (referred to as an "AR element") via technology. Embodiments of the present disclosure provide for a system and method for initialization and tracking of a mobile device, such as in an AR implementation.

Tracking, which involves determining device position and orientation of an AR-enabled device, can be challenging in AR implementations. The embodiments described herein provide improvements over the prior art by generating a database of features and their associated 3D coordinates and using the database to determine camera position and orientation. For example, one or more embodiments described herein provide for using data about an environment to generate a database of 2D features and associated 3D coordinates and using the database to determine a position and an orientation of a device within the environment. As an example, the position and the orientation of the device can then be used to display a digital visual element as part of an AR implementation. The techniques described herein represent a technical improvement because they can more accurately, reliably and more quickly perform tracking of a device moving through an environment using the generated database of 2D features and associated 3D coordinates.

Figure 1:
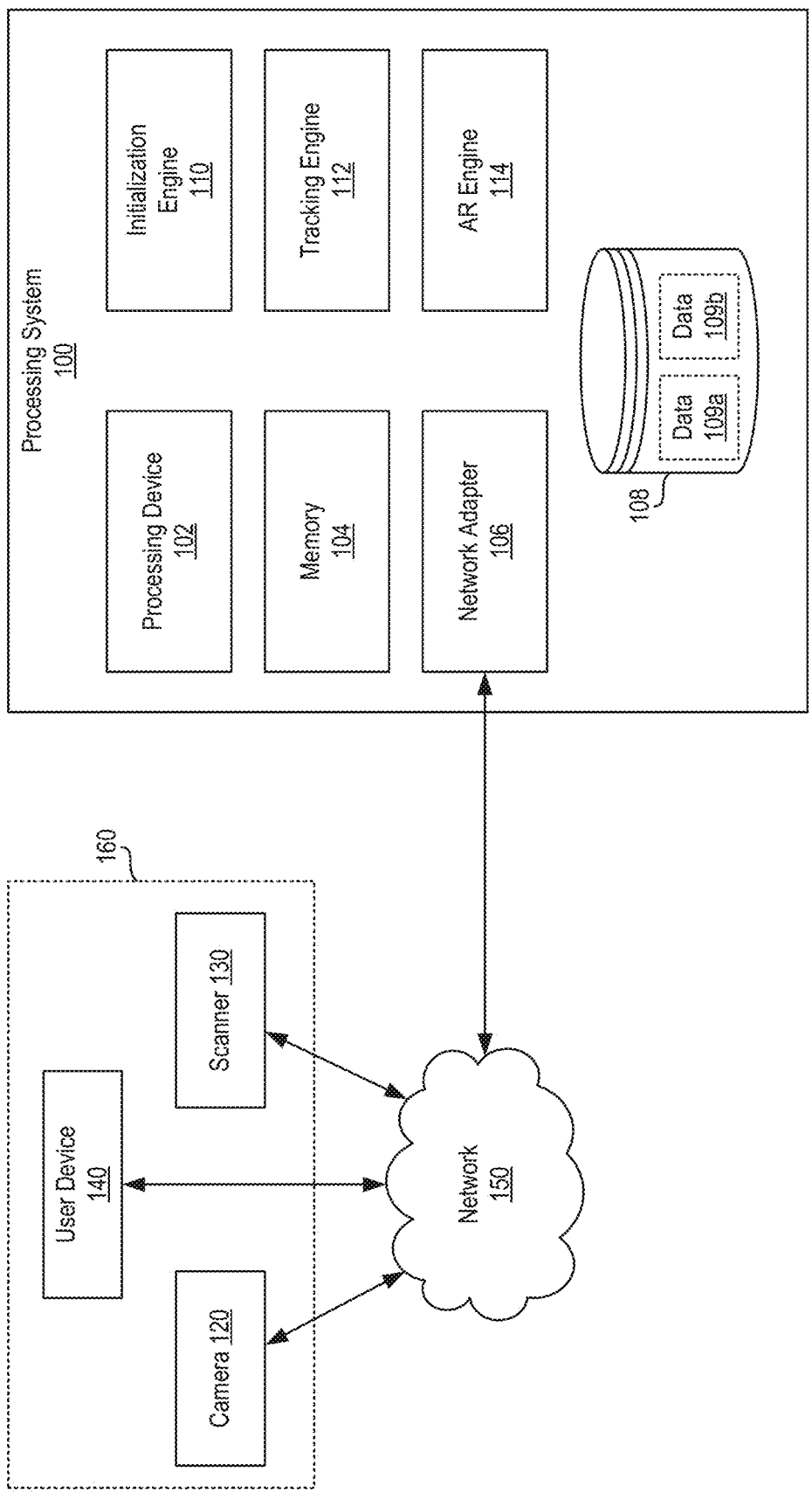
FIG. 1 depicts a block diagram of a processing system for performing initialization and tracking according to one or more embodiments described herein.

FIG. 1 depicts a block diagram of a processing system 100 for performing initialization and tracking according to one or more embodiments described herein. The processing system 100 includes a processing device 102, a memory 104, a network adapter 106, a data store 108 for storing data 109a, 109b, an initialization engine 110, a tracking engine 112, and an AR engine 114 configured and arranged as shown.

The various components, modules, engines, etc. described regarding the processing system 100 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 102 for executing those instructions. Thus a system memory (e.g., the memory 104) can store program instructions that when executed by the processing device 102 implement the engines described herein. Other engines can also be utilized to include other features and functionality described in other examples herein.

The network adapter 106 (e.g., the network adapter 926 of FIG. 9) provides for the processing system 100 to transmit data to and/or receive data from other sources, such as other processing systems, data repositories, and the like. As an example, the processing system 100 can transmit data to and/or receive data from a camera 120, a scanner 130, and/or a user device 140 directly and/or via a network 150.

The network 150 represents any one or a combination of different types of suitable communications networks such as, for example, cable networks, public networks (e.g., the Internet), private networks, wireless networks, cellular networks, or any other suitable private and/or public networks. Further, the network 150 can have any suitable communication range associated therewith and may include, for example, global networks (e.g., the Internet), metropolitan area networks (MANs), wide area networks (WANs), local area networks (LANs), or personal area networks (PANs). In addition, the network 108 can include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The camera 120 can be a 2D camera or a 3D camera (RGBD or time-of-flight for example). The camera 120 captures an image (or multiple images), such as of an environment 160. The camera 120 transmits the image to the processing system 100. In one or more embodiments, the camera 120 encrypts the image before transmitting it to the processing system 100. Although not shown, the camera 120 can include components such as a processing device, a memory, a network adapter, and the like, which may be functionally similar to those included in the processing system 100 as described herein.

In some examples, the camera 120 is mounted to a mobile base, which can be moved about the environment 160. In some examples, the camera 120 is disposed in or mounted to an unmanned aerial vehicle. In some examples, the camera 120 is mounted to a fixture, which is user-configurable to rotate about a roll axis, a pan axis, and a tilt axis. In such examples, the camera 120 is mounted to the fixture to rotate about the roll axis, the pan axis, and the tilt axis. Other configurations of mounting options for the camera 120 also are possible.

A coordinate measurement device, such as scanner 130 for example, is any suitable device for measuring 3D coordinates or points in an environment, such as the environment 160, to generate data about the environment. A collection of 3D coordinate points is sometimes referred to as a point cloud. According to one or more embodiments described herein, the scanner 130 is a three-dimensional (3D) laser scanner time-of-flight (TOF) coordinate measurement device. It should be appreciated that while embodiments herein may refer to a laser scanner, this is for example purposes and the claims should not be so limited. In other embodiments, other types of coordinate measurement devices or combinations of coordinate measurement devices may be used, such as but not limited to triangulation scanners, structured light scanners, laser line probes, photogrammetry devices, and the like. A 3D TOF laser scanner steers a beam of light to a non-cooperative target such as a diffusely scattering surface of an object. A distance meter in the scanner 130 measures a distance to the object, and angular encoders measure the angles of rotation of two axles in the device. The measured distance and two angles enable a processor in the scanner 130 to determine the 3D coordinates of the target.

A TOF laser scanner, such as the scanner 130, is a scanner in which the distance to a target point is determined based on the speed of light in air between the scanner and a target point. Laser scanners are typically used for scanning closed or open spaces such as interior areas of buildings, industrial installations, and tunnels. They may be used, for example, in industrial applications and accident reconstruction applications. A laser scanner, such as the scanner 130, optically scans and measures objects in a volume around the scanner 130 through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected and stored as a point cloud, which can be transmitted to the processing system 100 and stored in the data store 108 as data 109a about the environment 160.

In some examples, the scanner 130 is mounted to a mobile base, which can be moved about the environment 160. In some examples, the scanner 130 is disposed in or mounted to an unmanned aerial vehicle. In some examples, the scanner 130 is mounted to a fixture, which is user-configurable to rotate about a roll axis, a pan axis, and a tilt axis. In such examples, the scanner 130 is mounted to the fixture to rotate about the roll axis, the pan axis, and the tilt axis. Other configurations of mounting options for the scanner 130 also are possible.

According to one or more embodiments described herein, the camera 120 captures 2D image(s) of the environment 160 and the scanner 130 captures 3D information of the environment 160. In some examples, the camera 120 and the scanner 130 are separate devices; however, in some examples, the camera 120 and the scanner 130 are integrated into a single device. For example, the camera 120 can include depth acquisition functionality and/or can be used in combination with a 3D acquisition depth camera, such as a time of flight camera, a stereo camera, a triangulation scanner, LIDAR, and the like. In some examples, 3D information can be measured/acquired/captured using a projected light pattern and a second camera (or the camera 120) using triangulation techniques for performing depth determinations. In some examples, a time-of-flight (TOF) approach can be used to enable intensity information (2D) and depth information (3D) to be acquired/captured. The camera 120 can be a stereo-camera to facilitate 3D acquisition. In some examples, a 2D image and 3D information (i.e., a 3D data set) can be captured/acquired at the same time; however, the 2D image and the 3D information can be obtained at different times.

The user device 140 (e.g., a smartphone, a laptop or desktop computer, a tablet computer, a wearable computing device, a smart display, and the like) can also be located within or proximate to the environment 160. The user device 140 can display an image of the environment 160, such as on a display of the user device 140 (e.g., the display 935 of the processing system 900 of FIG. 9) along with a digital visual element as part of an AR implementation. In some examples, the user device 140 can include components such as a processor, a memory, an input device (e.g., a touchscreen, a mouse, a microphone, etc.), an output device (e.g., a display, a speaker, etc.), and the like. As one example, the user device 140 can include computer-executable instructions stored on a memory and executable by a processor to implement AR on the user device 140.

The processing system 100 provides for preforming initialization and tracking. As an example of the initialization, the camera 120 and/or the scanner 130 capture data 109a about the environment 160. The processing system 100 uses the data 109a about the environment 160 to generate the data 109b, which is a database of 2D features and associated 3D coordinates. The processing system 100 can then perform tracking, such as tracking the user device 140 as it moves through the environment 160. The tracking includes, for example, determining a position and an orientation of the user device 140 within the environment 160, which can be accomplished by comparing an image captured by the user device 140 to the data 109b, which is the database of 2D features and associated 3D coordinates.

Figure 2:
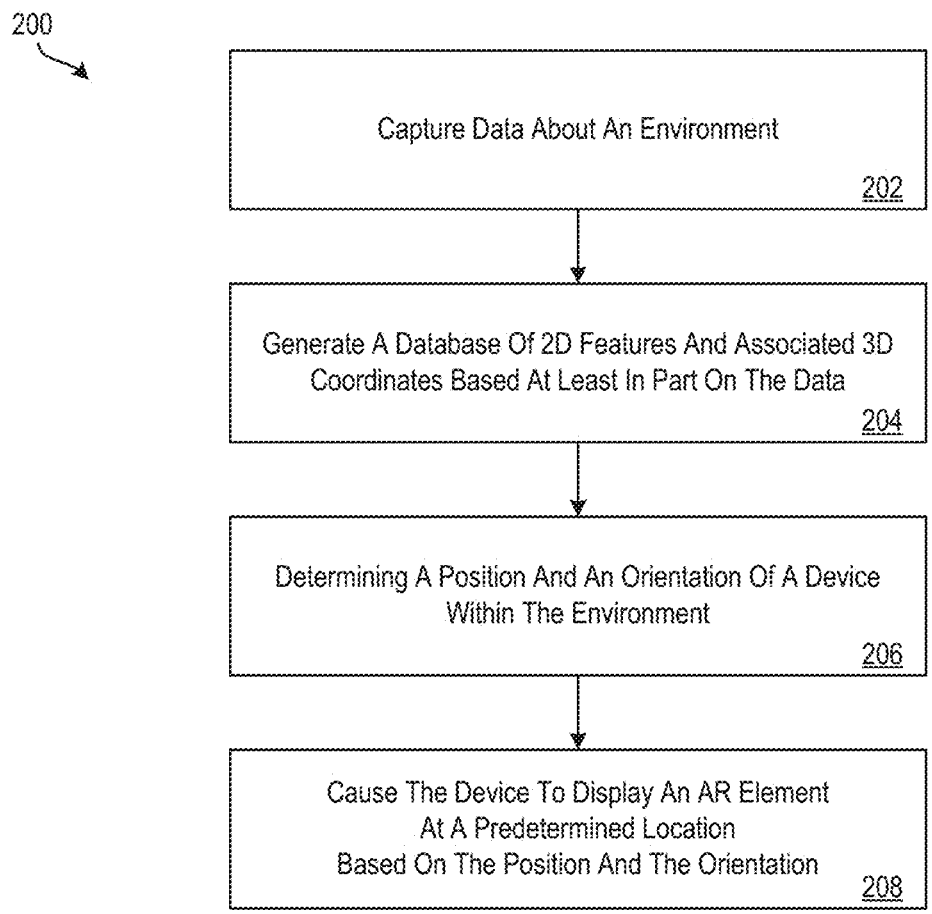
FIG. 2 depicts a flow diagram of a method for performing initialization and tracking according to one or more embodiments described herein.
Figure 3:
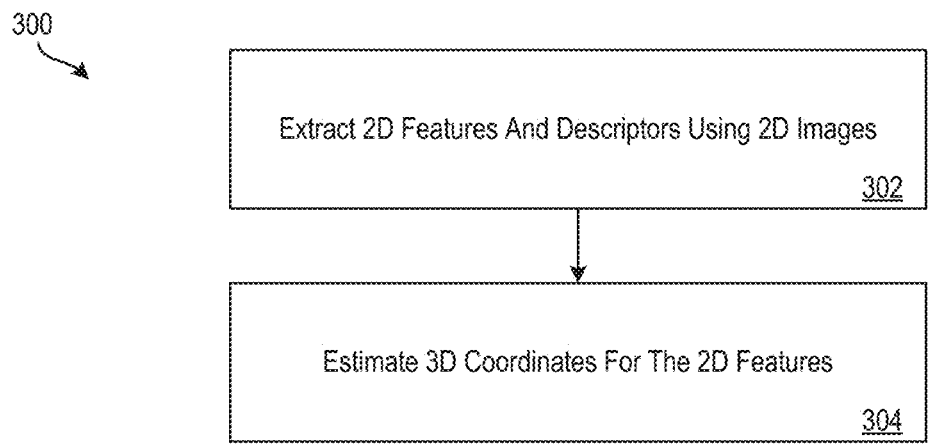
FIG. 3 depicts a flow diagram of a method for performing initialization according to one or more embodiments described herein.
Figure 4:
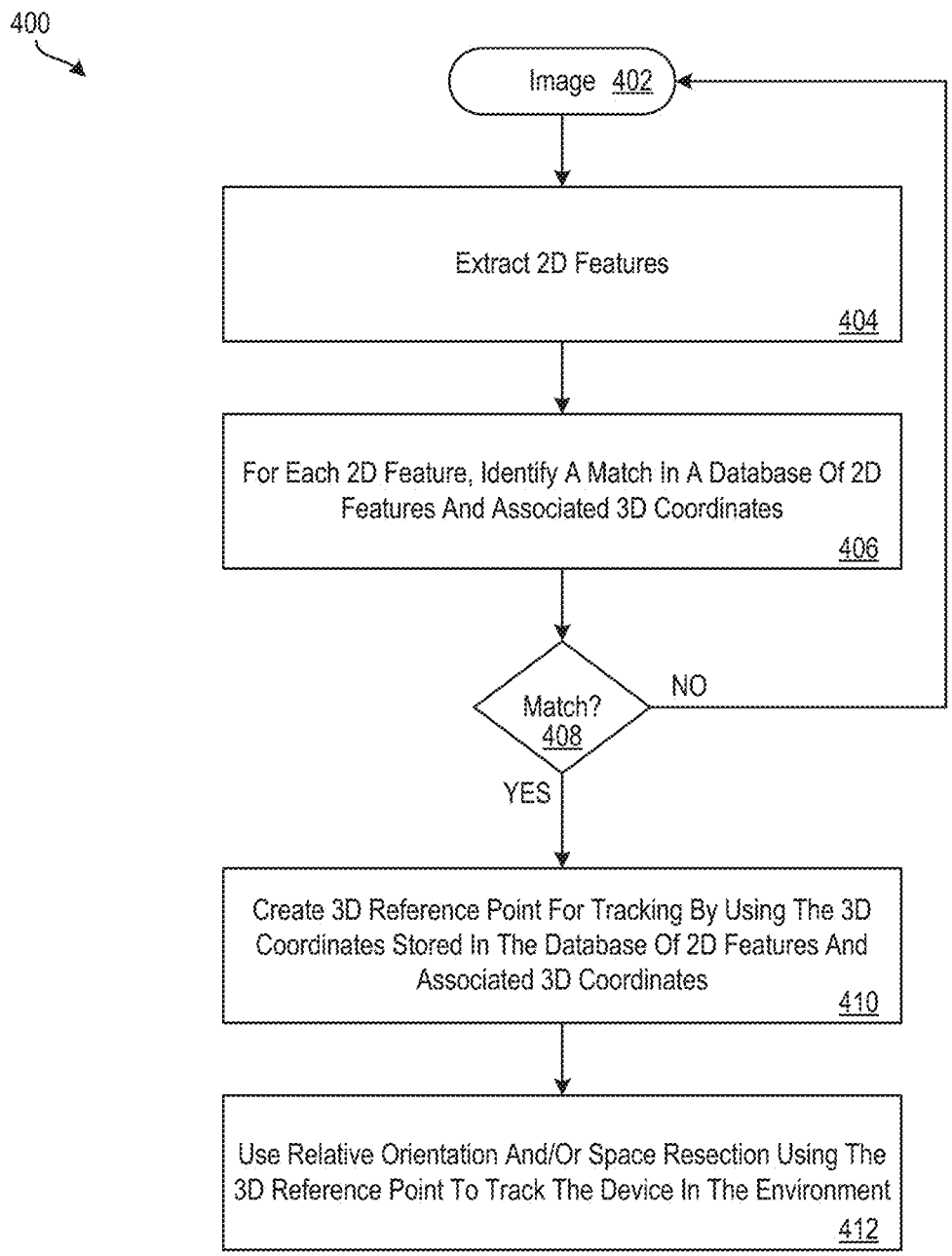
FIG. 4 depicts a flow diagram of a method for performing tracking according to one or more embodiments described herein.

The features and functionality of the processing system 100 are now described with reference to FIGS. 2-4 but are not so limited. In particular, FIG. 2 depicts a flow diagram of a method 200 for performing initialization and tracking according to one or more embodiments described herein. The method 200 can be performed by or implemented on any suitable processing system (e.g., the processing system 100 of FIG. 1, a cloud computing node (not shown), the processing system 900 of FIG. 9, etc.), any suitable processing device (e.g., the processing device 102 of FIG. 1, the processors 921 of FIG. 9, etc.), and/or combinations thereof. FIG. 2 is now described in more detail with reference to the elements of at least FIG. 1 but is not so limited.

At block 202, data about the environment 160 is captured. As one example, the camera 120 captures images about the environment 160 and transmits the images to the processing system 100. In some examples, the camera 120 can perform pre-processing (e.g., encryption, compression, feature recognition, etc.) on the images before transmitting the images to the processing system 100. As another example, the scanner 130 scans the environment 160 and captures 3D data about the environment 160 in the form of a point cloud. An example of such a scanner is shown and described herein with reference to FIGS. 6A, 6B, 7, and 8. The processing system 100 stores the data about the environment as data 109a in the data store 108.

At block 204, the processing system 100, using the initialization engine 110, performs an initialization, which includes generating a database of 2D features and associated 3D coordinates based at least in part on the data about the environment 160. The processing system 100 stores the database of 2D features and associated 3D coordinates as data 109b in the data store 108.

During the initialization, the initialization engine 110 uses the data 109a about the environment 160 captured by the camera 120 and/or the scanner 130. FIG. 3 depicts a flow diagram of a method 300 for performing initialization according to one or more embodiments described herein. At block 302, the initialization engine 110 extracts 2D features and descriptors using 2D images. At block 304, the initialization engine 110 estimates 3D coordinates for the 2D features. A scene of the environment 160 is pre-scanned by taking 2D images, which can be frame array or spherical images. The initialization engine 110 performs feature extraction on these images (e.g., the data 109a) and matches the features together from different images. Examples of feature extractors include, but are not limited to, the following:

Harris corner detector;
Harris-Laplace-scale-invariant version of Harris detector;
Multi-Scale Oriented Patches (MOPs) (includes a descriptor);
Scale-Invariant Feature Transform (SIFT) (includes a descriptor);
Speeded Up Robust Features (SURF) (includes a descriptor);
Features from Accelerated Segment Test (FAST);
Binary Robust Invariant Scalable Keypoints (BRISK); (includes a descriptor)
Oriented FAST and Rotated BRIEF (ORB) (includes a descriptor);
KAZE with M-SURF descriptor, which can outperform SIFT and SURF in some cases, AKAZE—accelerated version of KAZE with M-LDB descriptor (modified fast binary descriptor); and Learning Invariant Feature Transforms.

Matching the features includes recognizing a feature in multiple images and then estimating the 3D coordinates of that feature, such as using photogrammetry or laser scanning In order to do the feature matching, descriptors are defined for the extracted features. Some of the feature extractors include descriptor definitions like, SIFT, SURF, BRISK, and ORB. In practice, any feature descriptor definition can be associated to the extracted features. For example, the follow descriptor definitions are possible, as are other descriptor definitions:

Normalized gradient;

Principle Component Analysis (PCA) transformed image patch;

Histogram of oriented gradients; and

Gradient Location and Orientation Histogram (GLOH), Local Energy-Based Shape Histogram (LESH), BRISK, ORB, Fast Retina Keypoint (FREAK), and Local Discriminant Bases (LDB).

Photogrammetry is a technique for measuring objects using images, such as photographic images acquired by a digital camera for example. Photogrammetry can make 3D measurements from 2D images or photographs. When two or more images are acquired at different positions that have an overlapping field of view, common points or features may be identified on each image. By projecting a ray from the camera location to the feature/point on the object, the 3D coordinate of the feature/point may be determined using trigonometry or triangulation. In some examples, photogrammetry may be based on markers/targets (e.g., lights or reflective stickers) or based on natural features. To perform photogrammetry, for example, images are captured, such as with a camera (e.g., the camera 120) having a sensor, such as a photosensitive array for example. By acquiring multiple images of an object, or a portion of the object, from different positions or orientations, 3D coordinates of points on the object may be determined based on common features or points and information on the position and orientation of the camera when each image was acquired. In order to obtain the desired information for determining 3D coordinates, the features are identified in two or more images. Since the images are acquired from different positions or orientations, the common features are located in overlapping areas of the field of view of the images. It should be appreciated that photogrammetry techniques are described in commonly-owned U.S. Pat. No. 10,597,753, the contents of which are incorporated by reference herein. With photogrammetry, two or more images are captured and used to determine 3D coordinates of features.

Laser scanning is a technique for measuring objects using laser light beams projected onto the objects. Laser scanning generates a 3D point cloud of the object. FIGS. 6A, 6B, 7, and 8 depict a laser scanner 20 and further describe the technique of laser scanning. With laser scanning, a laser color panorama image can be created by stitching internal images together. The laser color panorama image is used in addition to the point cloud. The laser color panorama image is aligned to a coordinate system of the laser scanned point cloud. Therefore, the 3D coordinates of the features can be estimated directly by casting a ray in 3D space and performing a bilinear (or other suitable) interpolation technique.

In one or more examples, it is possible to combine photogrammetry and laser scanning In this way, feature extraction is performed in images (e.g., frame or spherical) using color or laser intensity (optical power of the returned light beam). The 3D coordinates of the features are determined first from the a point cloud measured by a coordinate measurement device (e.g., laser scanner) and, for those features with no 3D coordinates, photogrammetry is used to determining the 3D coordinates for those features. In some examples, feature extraction is based at least in part on an intensity image (e.g., a grayscale image generated from the optical power of the returned light beam), a color image, or light detection and ranging (lidar) depth data (e.g., an RGB-D camera). The intensity image is an image represented as a data matrix whose values represent optical intensities. The color image is an image with color values. The LIDAR depth data is indicates a distance value for a detected object relative to a lidar sensor. For example, the camera 120 can include a LIDAR sensor.

Once the initialization is performed, tracking can be performed using results of the initialization. For example, with continued reference to FIG. 2, at block 206, the processing system 100, using the tracking engine 112, performs tracking using the data 109b. Tracking involves determining a position and an orientation of a device, such as the user device 140, within the environment 160. As used herein, the term "position" refers to a particular location of an object (e.g., the user device 140) in a 3D coordinate system, which can be expressed for example using the coordinates (x, y, z) where "x" represents an x-axis coordinate, "y" represents a y-axis coordinate, and "z" represents a z-axis coordinate. The term "orientation" refers to how the object (e.g., the user device 140) is positioned within the 3D coordinate system, which can be expressed for example using roll, pitch, and yaw. Together, the position and orientation define a location with six-degrees of freedom and may be referred to as the "pose." Performing tracking can be accomplished by the tracking engine 112 performing a comparison between an image captured by the user device and the data 109a (e.g., a database of 2D features and associated 3D coordinates). The tracking is further described with reference to FIG. 4, which depicts a flow diagram of a method for performing tracking according to one or more embodiments described herein. The method 400 is now described in more detail.

At block 402, an image is received. For example, the user device 140 (using, for example, a camera associated with the user device 140) captures an image (or images) associated with the environment 160. At block 404, the tracking engine 112 extracts a 2D feature (or features) from the image (or images). Feature extraction can be performed, for example, using photogrammetry techniques as described herein.

At block 406, for each feature extracted at block 404, a match is identified in a database of 2D features and associated 3D coordinates (e.g., the data 109b). That is, the feature extracted at block 404 is compared to features stored in the data 109 to detect a matching feature, and a 3D coordinate associated with the matching feature is identified. This can be repeated for multiple features. In some examples, the matching is performed using a nearest neighbor search technique or by a graph of a neural network.

At decision block 408, it is determined whether a match is detected in the database at block 406. If no match is detected, the method 400 restarts at block 402. If, however, a match is detected, the method proceeds to block 410.

At block 410, a 3D reference point is created that is used for tracking the user device 140 as it moves through the environment 160. The 3D reference point for tracking is created using the 3D coordinates stored in the database of 2D features and associated 3D coordinates (e.g., the data

109*b*). For example, the 3D reference point is a 3D coordinate that is determined based on one or more 3D coordinates associated with one or more 2D features. The 3D coordinate represents an approximate location of the user device 140 within the environment. The 3D reference point is established by searching the matched features from block 406 in the data 109*b*, and if a match is found, the 3D reference point is created using an identifier or label of the matched feature and 3D coordinates associated therewith as stored in the data 109*b*. The 3D reference point can be used in photogrammetry, and thus the image from block 402 can be registered to a real-world 3D coordinate system. This provides a significant increase in the reliability of tracking when there may not be sufficient overlap between images.

At block 412, the 3D reference point is used to track the user device 140 within the environment. The tracking can include using relative orientation and/or space resection to determine the position and the orientation of the user device 140.

With continued reference to FIG. 2, at block 208, the AR engine 114 causes the user device 140 to display an AR element at a predetermined location based at least in part on the position and the orientation determined at block 206. Examples of AR elements include digital visual elements, sound, or other sensory stimuli. The predetermined location is determined by a designer of the AR environment. For example, the designer can associated a particular AR element with an object. When the user device 140 is within a threshold proximity to the object, the AR element can be caused to be displayed.

Regarding the method 200 of FIG. 2, additional processes also may be included. It should be understood that the process depicted in FIG. 2 represents an illustration and that other processes may be added or existing processes may be removed, modified, or rearranged without departing from the scope of the present disclosure. For example, one or more of the blocks 202, 204, 206, 208 can be removed, modified, or rearranged without departing from the scope of the present disclosure.

Examples for tracking the user device 140 are now described. Once the initialization is performed as described herein, tracking can be performed using results of the initialization. For example, the processing system 100, using the tracking engine 112, performs tracking using the data 109*b*. It should be appreciated that the tracking engine 112 can be implemented in the processing system 100 or the user device 140 or a combination thereof. Tracking involves determining a position (x, y, z) and an orientation (pitch, roll, yaw) of a device, such as the user device 140, within the environment 160. Thus, the user device 140 can be tracked within the environment 160 by based on its position and orientation (e.g., six degrees of freedom) reliably and accurately according to one or more embodiments described herein.

An example application for tracking is floor flatness and levelness visualization and feedback to a user. Floor flatness and levelness determination can be implemented using a 3D coordinate measurement device, such as a laser scanner. Concrete is frequently used as flooring at warehouses, factories, and the like. During construction, wet concrete is poured and then manipulated (e.g., by hand, by automated machines, etc.) until it is flat and level within predetermined specifications. Once dry, the concrete is difficult to manipulate resulting in costly delays in reworking areas that are out of specification. Due to the nature of wet concrete and the typically large areas being poured, it is difficult to ensure flat and level floors to acceptable levels, especially where floor flatness and levelness is held to tight specifications. Floor flatness refers to the change in elevation difference between two consecutive measurements of elevation difference each measured over a certain distance. Floor levelness refers to the difference in elevation between two opposing points a certain distance apart.

Floor flatness and levelness determination can be performed using scan data obtained by one or more 3D coordinate measurement devices, such as laser scanners. For example, a section of concrete slab flooring is scanned by one or more laser scanners. Scan data collected by the one or more laser scanners is analyzed and compared to a selected standard or build requirement, and out-of-tolerance (i.e., defective) areas are determined. Areas that are out-of-tolerance can then be corrected, such as by adding or removing material to cause the floor to be within a desired tolerance for flatness and levelness. When evaluating floor flatness and levelness, it may be useful to track a position of a user device, such as the user device 140, relative to the floor (e.g., the environment 160) being evaluated, such as using one or more embodiments described herein.

Another example application for tracking is tracking a position of a device such as the user device 140 in an indoor environment. Results of device tracking in an indoor environment are now described with reference to FIGS. 5A-5H.

Figure 5A:
FIG. 5A depicts a panoramic image of an indoor environment according to one or more embodiments described herein.

FIG. 5A depicts a panoramic image 500 of an indoor environment (e.g., the environment 160) according to one or more embodiments described herein. In this example, the indoor environment is an indoor meeting room, such as a conference room. The indoor environment is difficult for tracking applications because: it has solid colored (e.g., white) walls and ceiling with a low number of stable features; there are windows and light reflecting objects in the indoor environment; and the color panorama image (e.g., the panoramic image 500) has areas/regions of overexposure. The panoramic image 500 may be acquired by a panoramic or omnidirectional camera, such as a Model Theta camera manufactured by Ricoh Company of Tokyo, Japan for example.

Figure 5B:
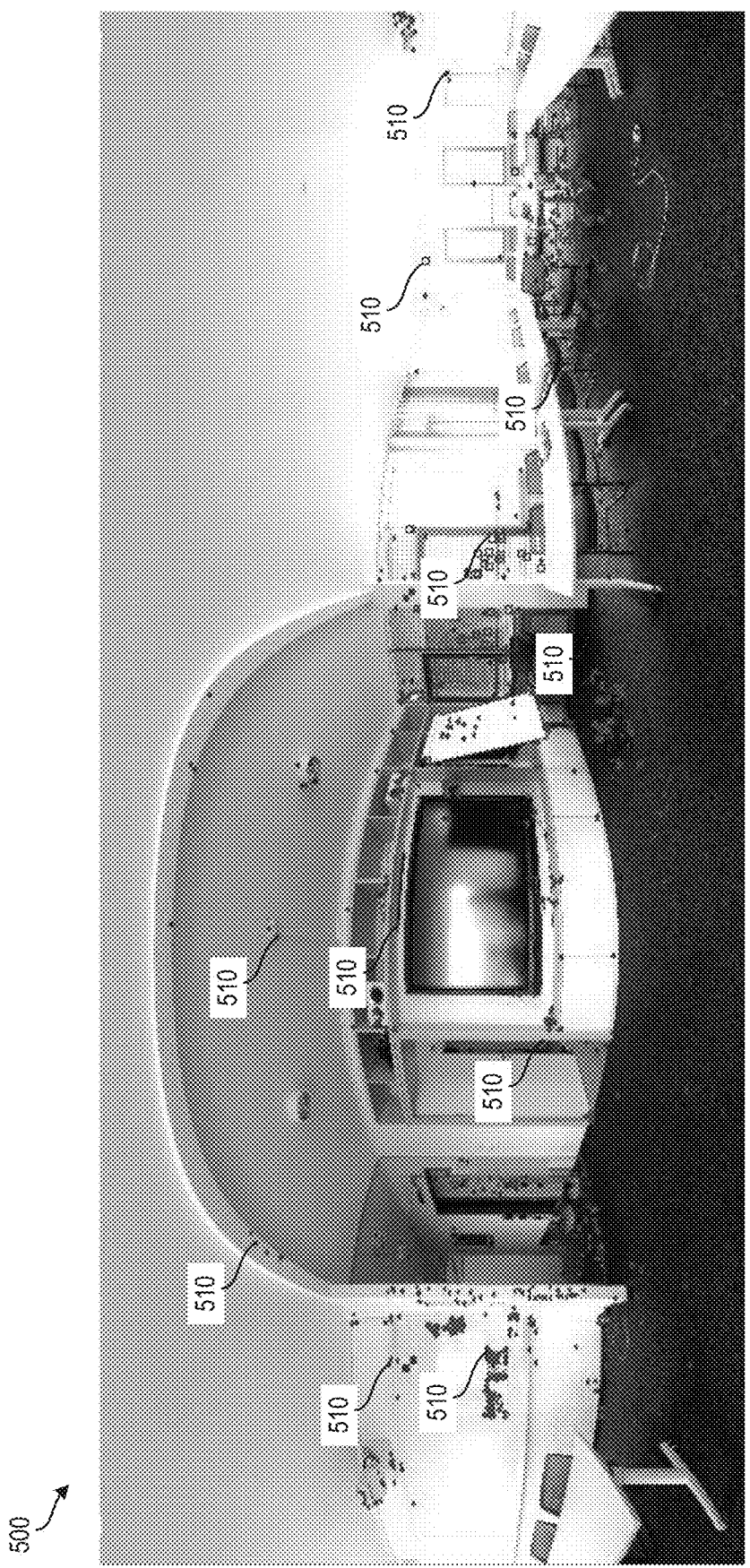
FIG. 5B depicts extracted features from the panoramic image of FIG. 5A according to one or more embodiments described herein

FIG. 5B depicts extracted features 510 from the panoramic image 500 of FIG. 5A according to one or more embodiments described herein. For example, the techniques described herein (see, e.g., FIG. 4) can be used to extract 2D features from the panoramic image 500. According to one or more embodiments described herein, each of the extracted features 510 includes a descriptor as a unique identifier and corresponding 3D coordinates, as shown in FIG. 5C. The descriptors (or "feature descriptors") encode information into a series of numbers and acts as a sort of numerical fingerprint that can be used to differentiate features from one another. As an example, FIG. 5C depicts a table 520 of the extracted features 510 from FIG. 5B. In the table 520, each of the extracted features is identified by a point ID (i.e., a unique identifier) and 3D coordinates in the form of "X" coordinates, "Y" coordinates, and "Z" coordinates. For example, the point ";0" has an "X" coordinate of 1364.726, a "Y" coordinate of −241.780, and a "Z" coordinate of −619.995. According to one or more embodiments described herein, the coordinates for the extracted features are relative to a coordinate system of the scanner 130.

Figure 5D:
FIG. 5D depicts a collection of images taken with a camera according to one or more embodiments described herein.

FIG. 5D depicts a collection 530 of images taken with a camera, such as a camera of the user device 140 or another suitable device such as a digital single-lens reflex (DSLR) camera, according to one or more embodiments described herein. The images of the collection 530 are merely examples of some possible images. In this example, a device, such as the user device 140, moves throughout the indoor environment (e.g., the environment 160) and captures the images of the collection 530.

Figure 5E:
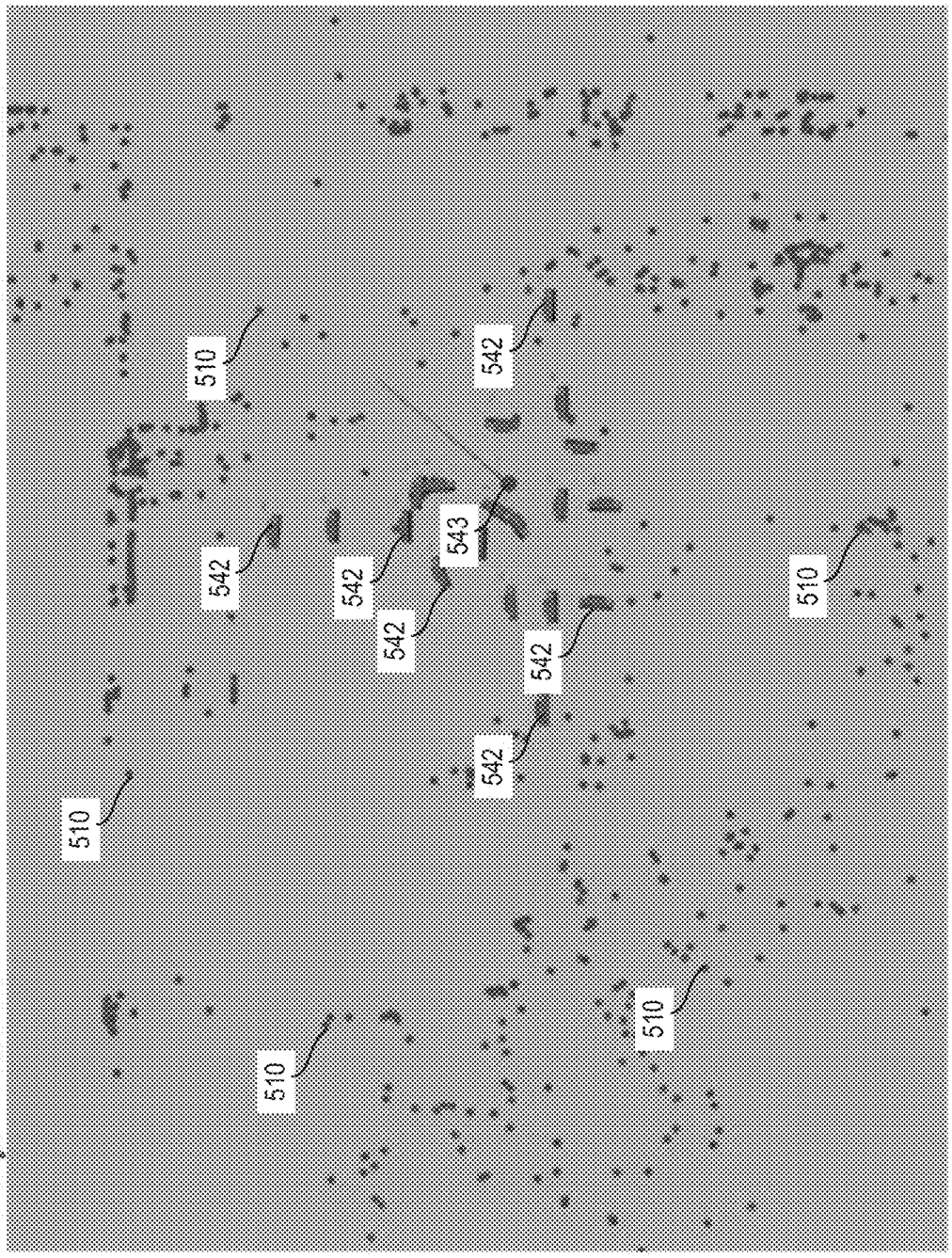
FIGS. 5E and 5F depict a top view representation of the indoor environment and a side view representation of the indoor environment, respectively, according to one or more embodiments described herein.
Figure 5F:
Figure 5F:
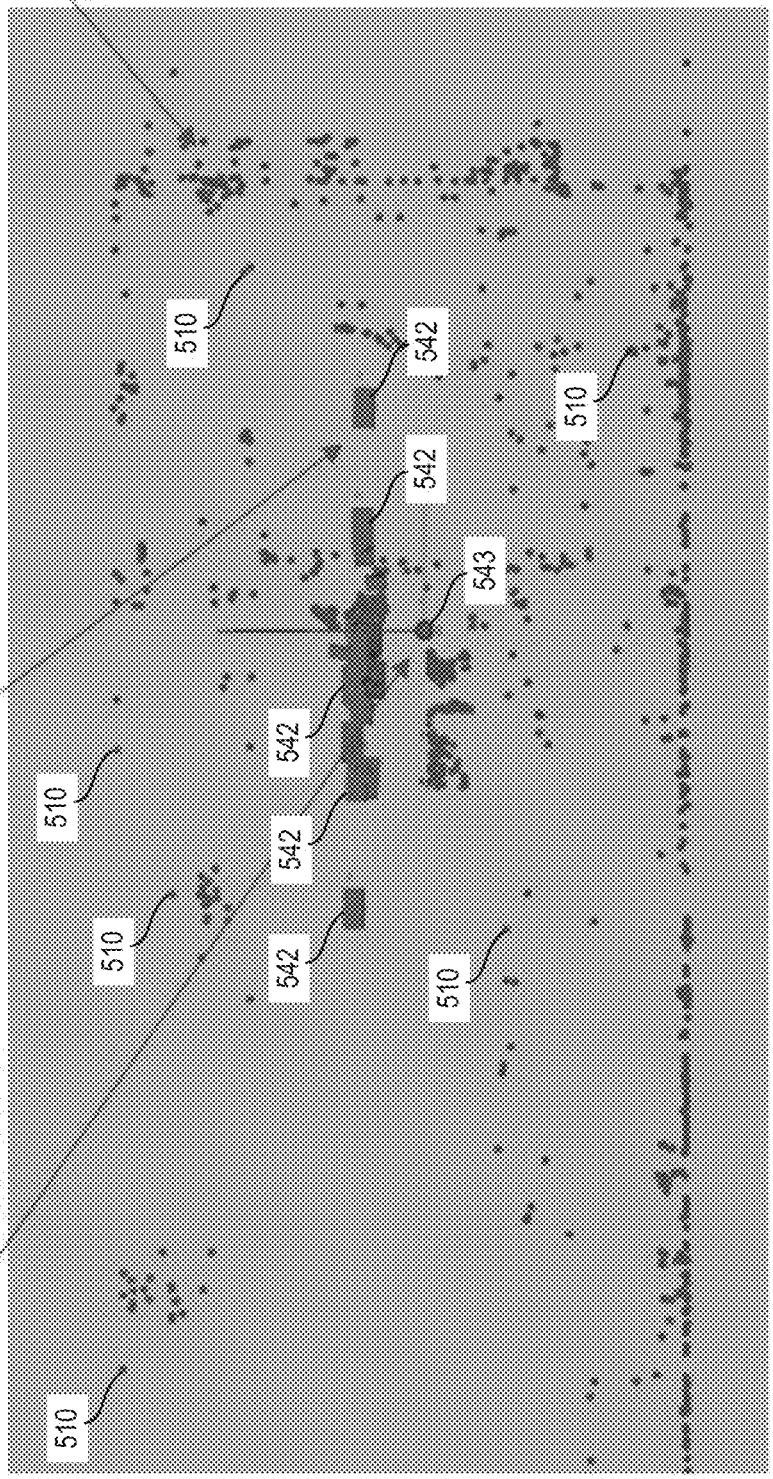

Using the techniques described herein for tracking using features, the images of the collection 530 of images are tracked within the indoor environment using the extracted features 510 from the panoramic image 500. The results are shown in FIGS. 5E and 5F. Particularly, FIG. 5E depicts a top view representation 540 of the indoor environment, and FIG. 5F depicts a side view representation 541 of the indoor environment, according to one or more embodiments described herein. In this example, both the top view representation 540 and the side view representation 541 show the location of the images as blocks 542 and the extracted features 510. It should be appreciated that the top view representation 540 and the side view representation 541 are shown with respect to a coordinate system of the scanner 130 (e.g., a laser scanner), which is located at the point 543.

Figure 5G:
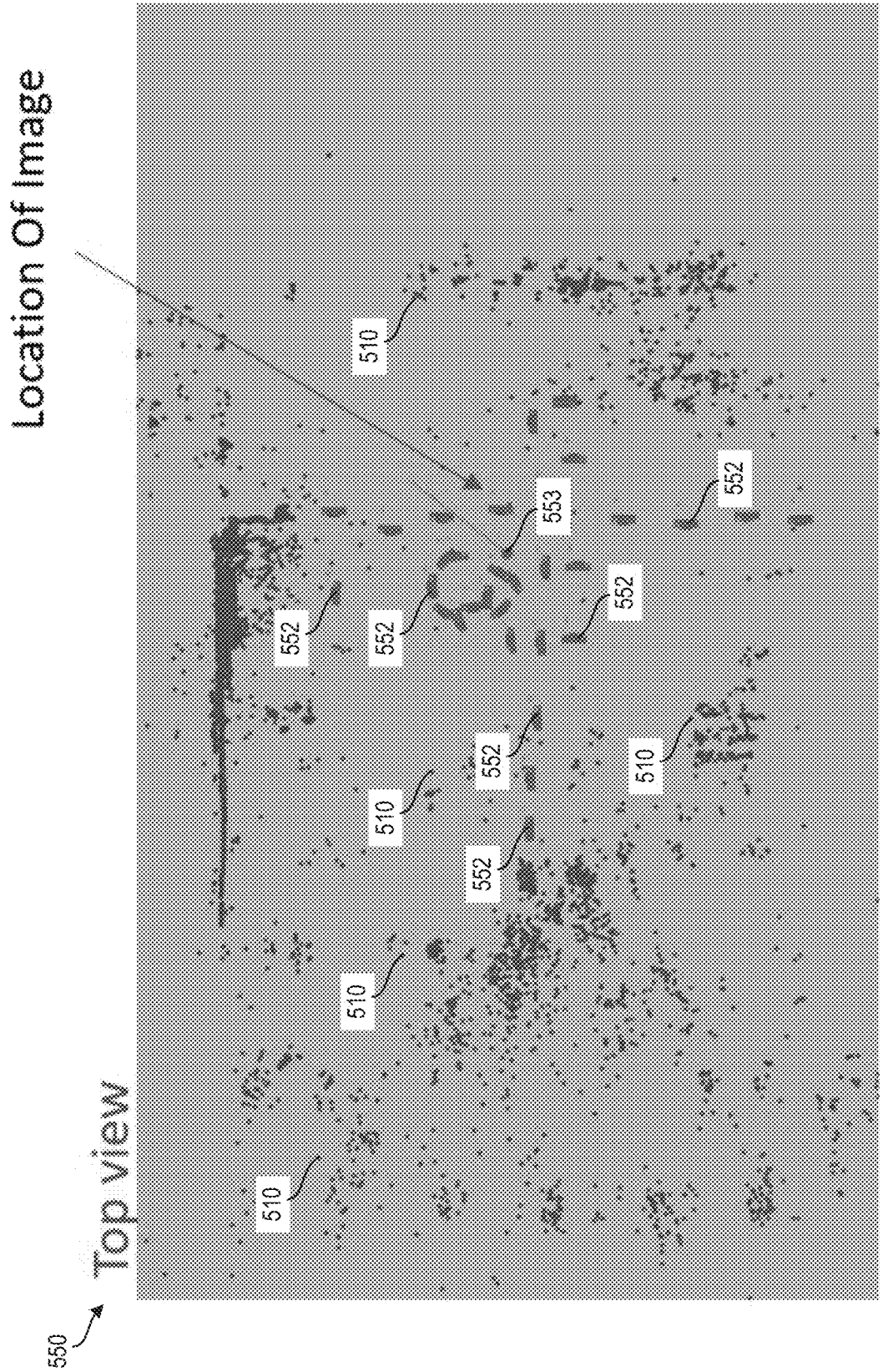
FIGS. 5G and 5H depict a top view representation of the indoor environment and a side view representation of the indoor environment, respectively, according to one or more embodiments described herein.
Figure 5H:
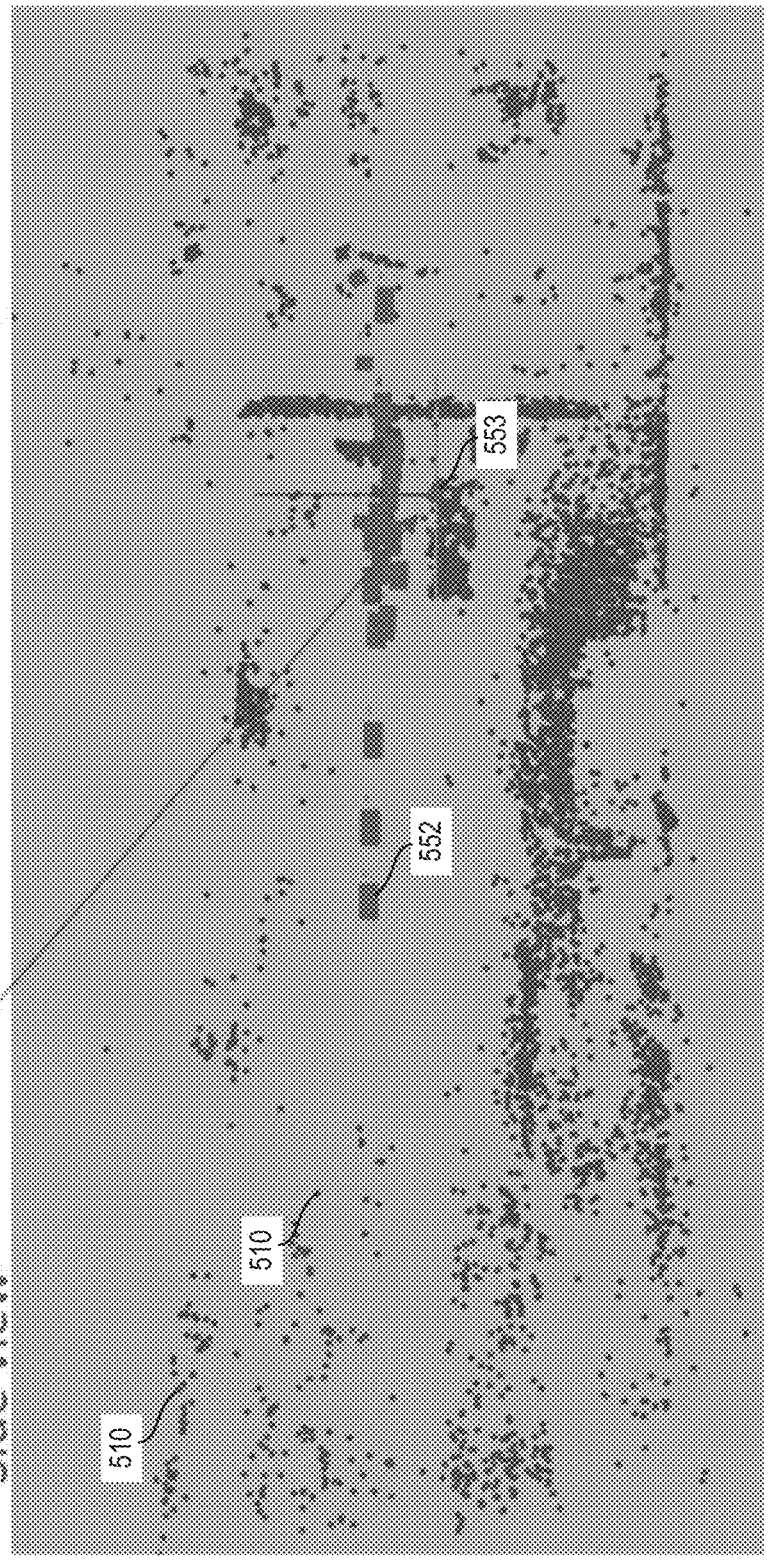

As another example, the techniques described herein can perform tracking using features and photogrammetry. For example, the images of the collection 530 of images are tracked within the indoor environment using the extracted features 510 from the panoramic image 500 as well as photogrammetry as described herein. The results are shown in FIGS. 5G and 5H. Particularly, FIG. 5G depicts a top view representation 550 of the indoor environment, and FIG. 5H depicts a side view representation 551 of the indoor environment, according to one or more embodiments described herein. In this example, both the top view representation 550 and the side view representation 551 show the location of the images as blocks 552 and the extracted features 510. It should be appreciated that the top view representation 540 and the side view representation 541 are shown with respect to a coordinate system of the scanner 130 (e.g., a laser scanner), which is located at the point 553.

In each of FIGS. 5E-5H, the location and orientation of the blocks 542, 552 represent the location and orientation of the camera (e.g., the user device 140) when the images of the collection 530 of images were taken relative to the location of the scanner 130 (e.g., the point 543 and/or the point 553).

From these figures, it should be appreciated that the images of the collection 530 of images can be located and oriented successfully with 3D reference points alone and/or in combination with photogrammetry techniques. Further, it should be appreciated that a gap between captured images in the collection 530 of images has little to no impact on the accuracy and reliability of the techniques described herein. Therefore, tracking is reliable and applicable independent of the location of the images of the collection 530 of images relative to one another.

One or more embodiments described herein can also be used to identify areas/regions within an environment (such as the environment 160) that may have changed since the database of 2D features and associated 3D coordinates was generated. For example, feature points captured by the user device 140 can be compared to the feature points stored in the database. Where differences are observed (e.g., based on the difference with respect to feature points in the database relative to the feature points identified by the user device 140), an indication can be provided on a display of the user device 140 (e.g., mark on a mobile camera image) with those regions that have changed (or may have changed) within the environment. In some examples, the database of 2D features and associated 3D coordinates can be updated with those regions that have changed (or may have changed) within the environment. Following identification of these changed regions, another 2D and/or 3D scan may be taken of the environment to update database. In an embodiment, a mobile device such as a SPOT robot by Bostin Dynamics or the like could be used to automatically rebuild the damaged portion of the database. According to one or more embodiments described herein, changes in the location of fiducial features/markers such as a fiducial sphere can be identified. For example, a fiducial feature can be placed in the environment when the data about the environment are captured and when the device is in the environment to interact with the environment. Then, when user device within the environment captures an image(s), it can be determined whether the location of the fiducial feature is as expected. An unexpected change in a location of such a fiducial feature/marker could cause an alarm or other alert to be issued to notify a user to ensure that the fiducial feature/marker is positioned in a correct location consistent with the database. Following changes in the fiducial features/markers, the database can be updated.

Referring now to FIGS. 6A, 6B, 7, and 8, a laser scanner 20 is shown for optically scanning and measuring the environment surrounding the laser scanner 20. It should be appreciated that while embodiments herein describe a phase-based time of flight scanner, this is for example purposes and the claims should not be so limited. In other embodiments, other types of three-dimensional (3D) coordinate measurement devices may be used to generate a point cloud. These 3D coordinate measurement devices include pulsed time of flight scanners, photogrammetry devices, laser line probes, triangulations scanners, area scanners, laser trackers, structured light scanners, and articulated arm coordinate measurement machines for example. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 29. In one embodiment, the emitted light beam 29 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 29 is amplitude or intensity modulated, for example, with a sinusoidal waveform or with a rectangular waveform. The emitted light beam 29 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 29 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby, moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system. In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

Figure 6A:
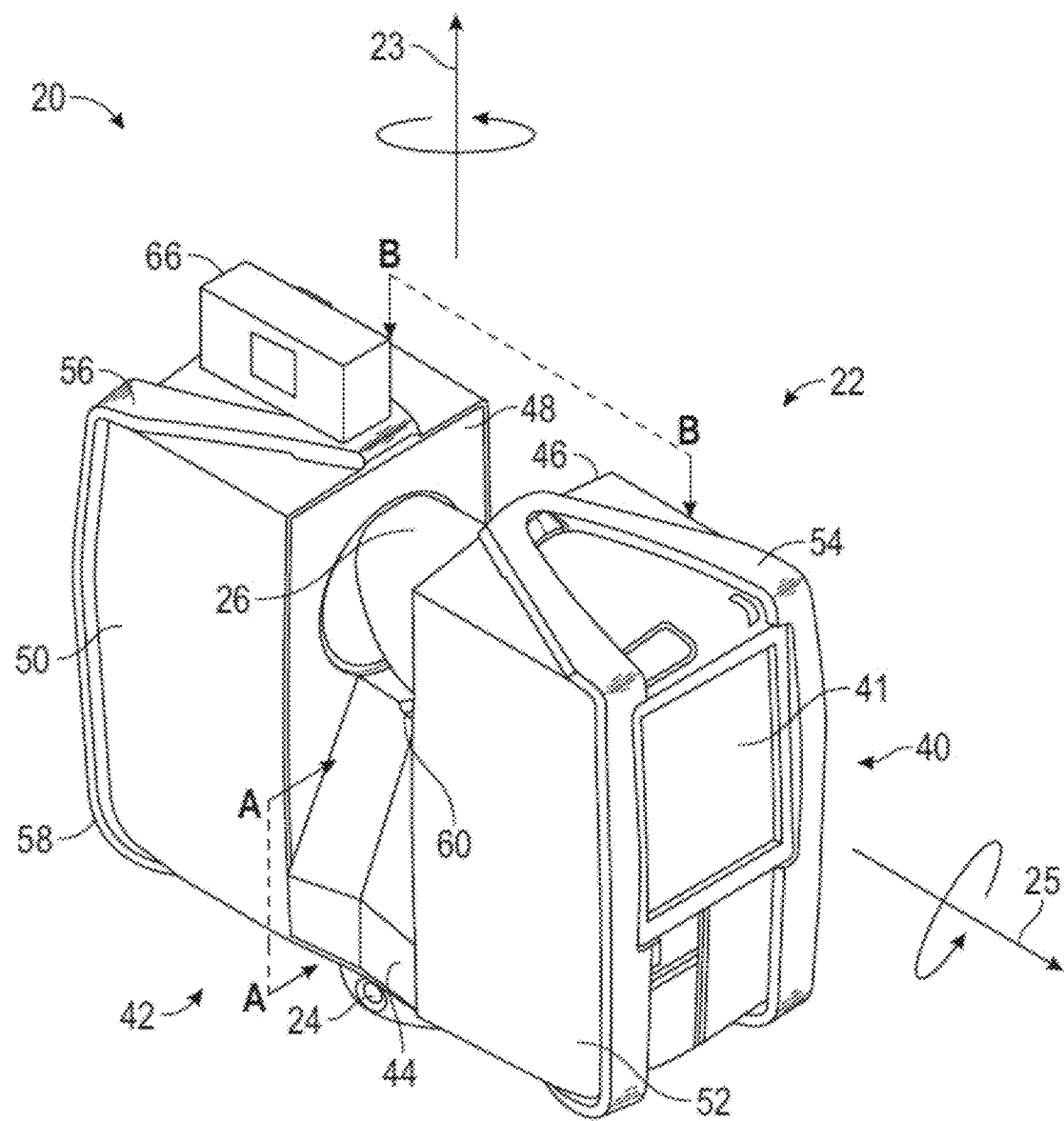
FIG. 6A depicts a perspective view of a laser scanner according to one or more embodiments described herein.

The measuring head 22 may include a display device 40 integrated into the laser scanner 20. The display device 40 may include a graphical touch screen 41, as shown in FIG. 6A, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 52 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 52, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 29 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera.

In an embodiment, a central color camera (first image acquisition device) 712 is located internally to the scanner and may have the same optical axis as the 3D scanner device. In this embodiment, the first image acquisition device 712 is integrated into the measuring head 22 and arranged to acquire images along the same optical pathway as emitted light beam 29 and reflected light beam 32. In this embodiment, the light from the light emitter 28 reflects off a fixed mirror 716 and travels to dichroic beam-splitter 718 that reflects the light 717 from the light emitter 28 onto the rotary mirror 26. In an embodiment, the mirror 26 is rotated by a motor 736 and the angular/rotational position of the mirror is measured by angular encoder 734. The dichroic beam-splitter 718 allows light to pass through at wavelengths different than the wavelength of light 717. For example, the light emitter 28 may be a near infrared laser light (for example, light at wavelengths of 780 nm or 1150 nm), with the dichroic beam-splitter 718 configured to reflect the infrared laser light while allowing visible light (e.g., wavelengths of 400 to 700 nm) to transmit through. In other embodiments, the determination of whether the light passes through the beam-splitter 718 or is reflected depends on the polarization of the light. The camera 712 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 6B:
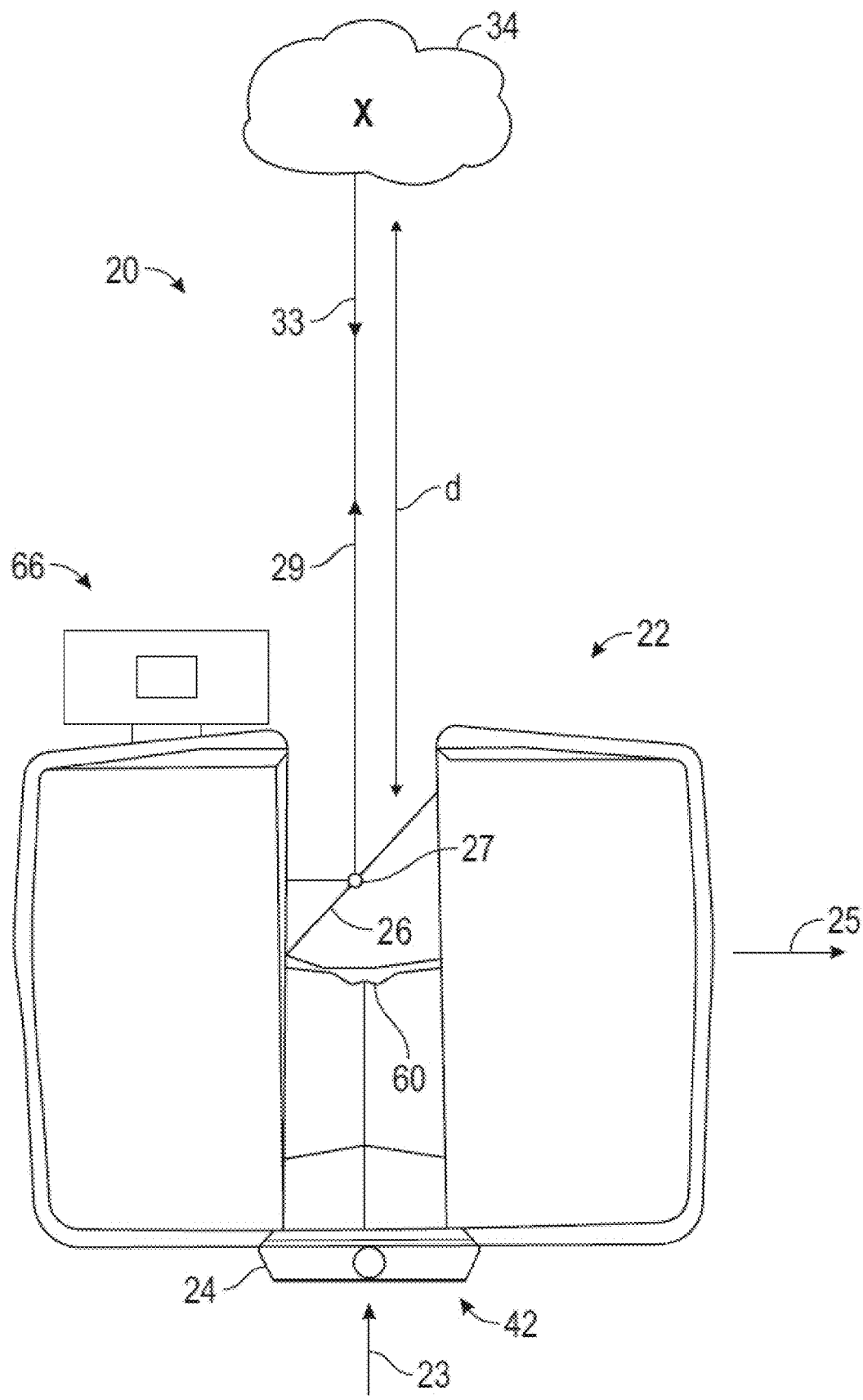
FIG. 6B depicts a side view of the laser scanner illustrating a method of measurement according to one or more embodiments described herein.
Figure 7:
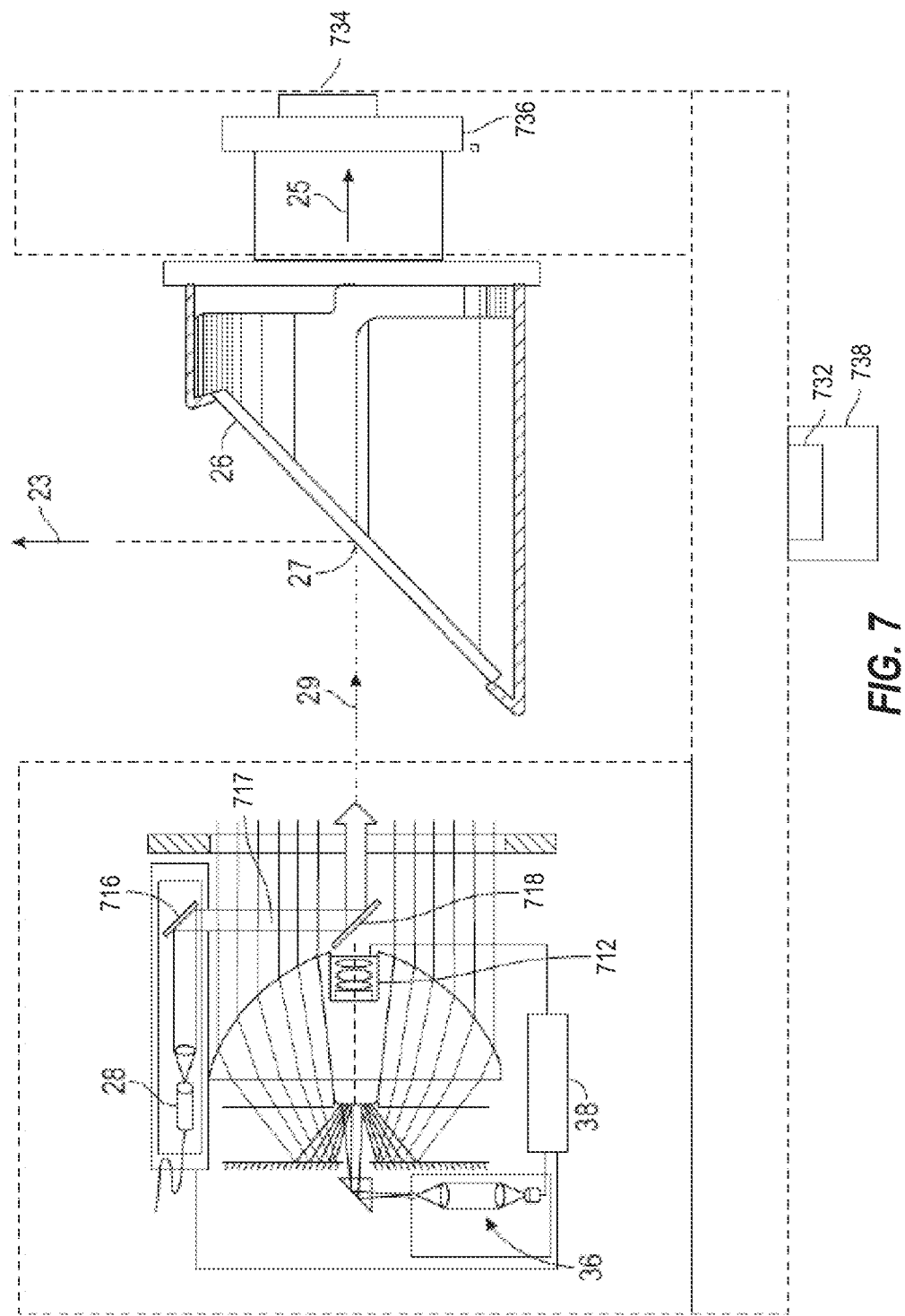
FIG. 7 depicts a schematic illustration of the optical, mechanical, and electrical components of the laser scanner according to one or more embodiments described herein.
Figure 8:
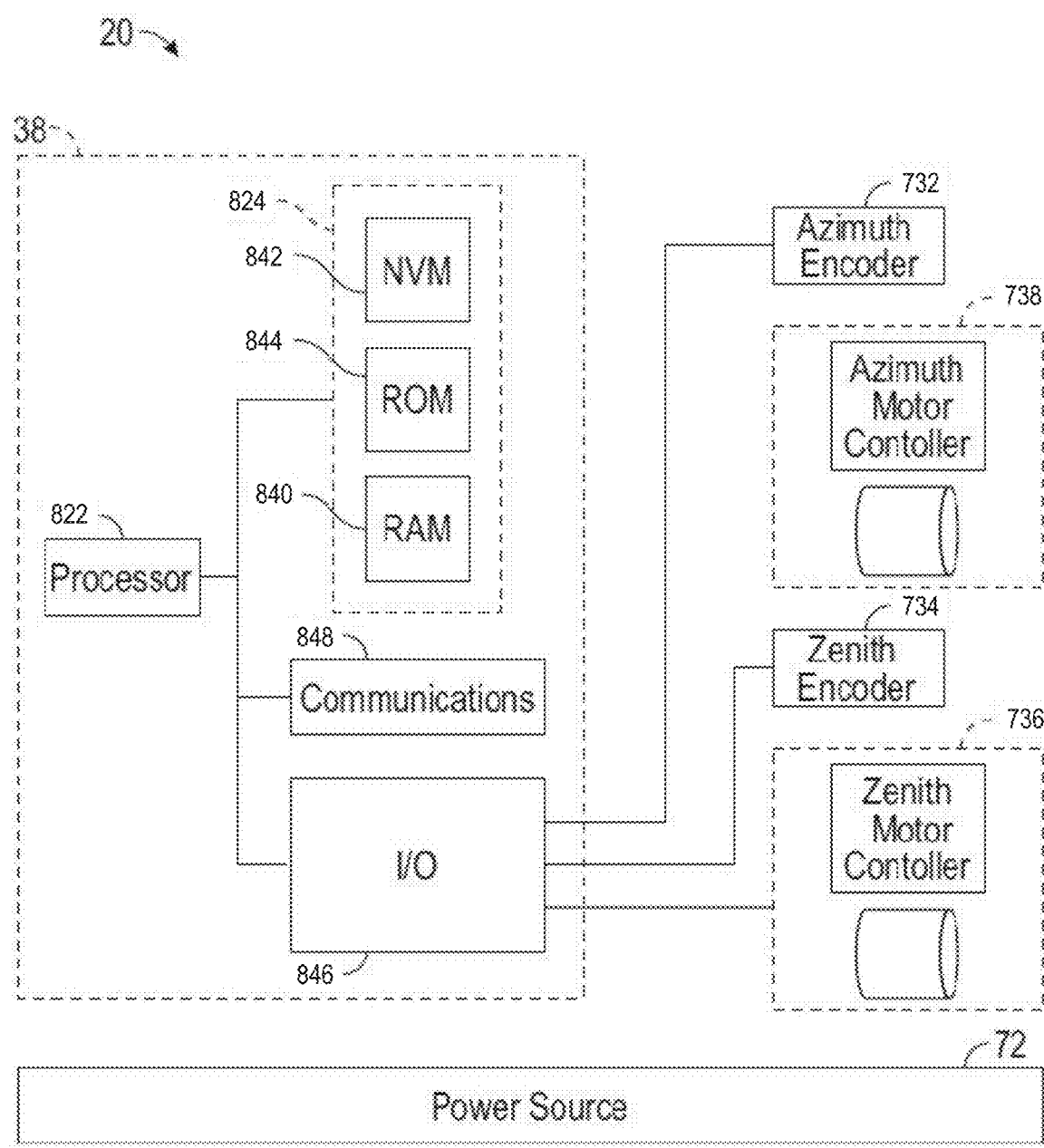
FIG. 8 depicts a schematic illustration of the laser scanner of FIG. 6A according to one or more embodiments described herein.

Referring now to FIG. 8 with continuing reference to FIGS. 6A, 6B, and 7, elements are shown of the laser scanner 20. Controller 38 is a suitable electronic device capable of accepting data and instructions, executing the instructions to process the data, and presenting the results. The controller 38 includes one or more processing elements 822 (also referred to as "processors" or "processing devices"). The processors may be microprocessors, field programmable gate arrays (FPGAs), digital signal processors (DSPs), and generally any device capable of performing computing functions. The one or more processors 822 have access to memory 824 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by a panoramic camera (not shown), angular/rotational measurements by a first or azimuth encoder 732, and angular/rotational measurements by a second axis or zenith encoder 734.

In general, controller 38 accepts data from encoders 732, 734, light receiver 36, light emitter 28, and the panoramic camera (not shown) and is given certain instructions for the purpose of generating a 3D point cloud of a scanned environment. Controller 38 provides operating signals to the light emitter 28, light receiver 36, the panoramic camera (not shown), zenith motor 736 and azimuth motor 738. The controller 38 compares the operational parameters to predetermined variances and if the predetermined variance is exceeded, generates a signal that alerts an operator to a condition. The data received by the controller 38 may be displayed on a user interface coupled to controller 38. The user interface may be one or more LEDs (light-emitting diodes) 82, an LCD (liquid-crystal diode) display, a CRT (cathode ray tube) display, a touch-screen display or the like. A keypad may also be coupled to the user interface for providing data input to controller 38. In one embodiment, the user interface is arranged or executed on a mobile computing device that is coupled for communication, such as via a wired or wireless communications medium (e.g., Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internee) Protocol), RS-232, ModBus, and the like. Additional systems may also be connected to LAN with the controllers 38 in each of these systems being configured to send and receive data to and from remote computers and other systems. The LAN may be connected to the Internet. This connection allows controller 38 to communicate with one or more remote computers connected to the Internet.

The processors 822 are coupled to memory 824. The memory 824 may include random access memory (RAM) device 840, a non-volatile memory (NVM) device 842, and a read-only memory (ROM) device 844. In addition, the processors 822 may be connected to one or more input/output (I/O) controllers 846 and a communications circuit 848. In an embodiment, the communications circuit 848 provides an interface that allows wireless or wired communication with one or more external devices or networks, such as the LAN discussed above.

Controller 38 includes operation control methods embodied in computer instructions written to be executed by processors 822, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

Figure 9:
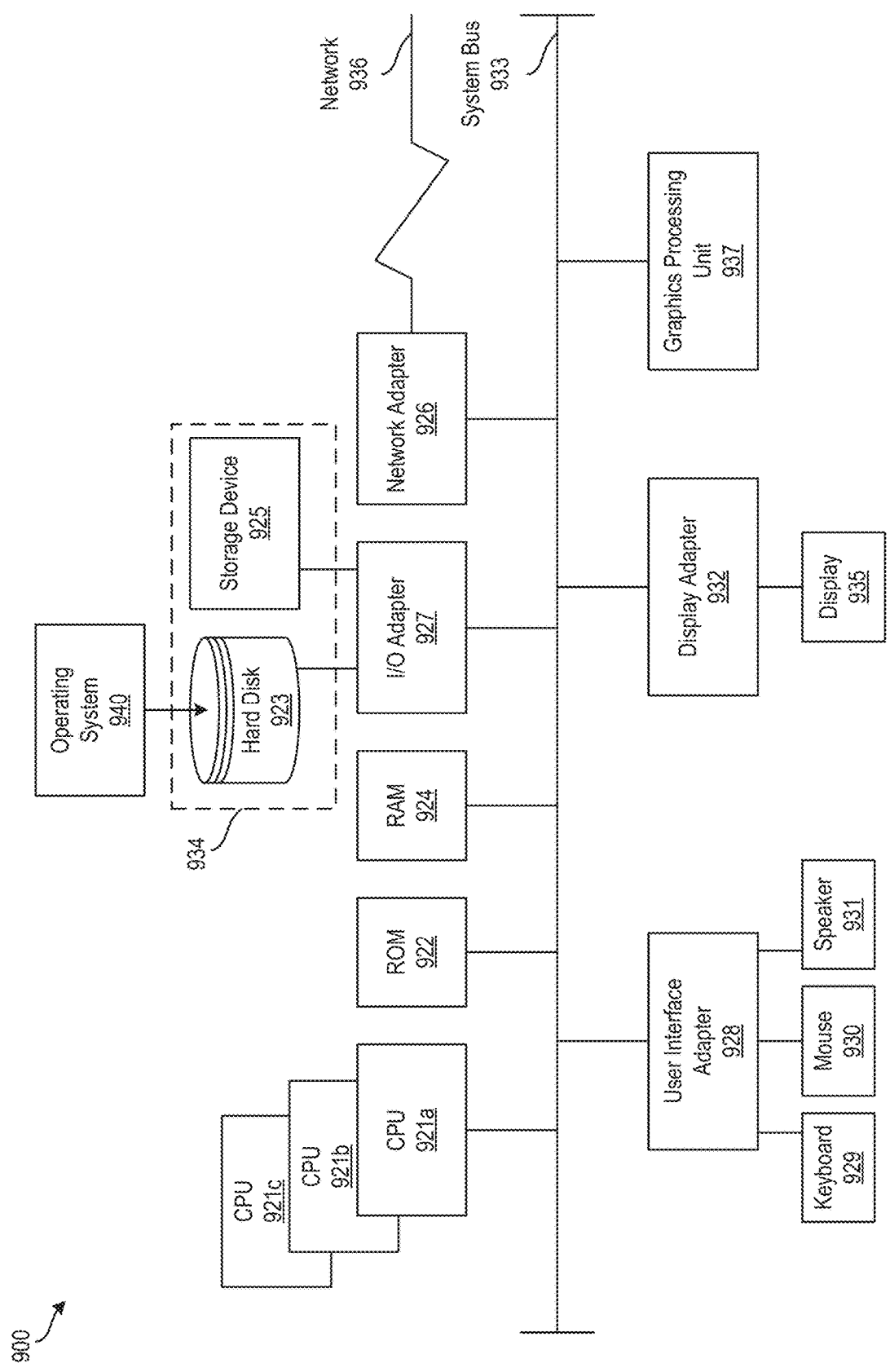
FIG. 9 depicts a block diagram of a processing system for implementing the presently described techniques according to one or more embodiments described herein.

It is understood that one or more embodiments described herein is capable of being implemented in conjunction with any other type of computing environment now known or later developed. For example, FIG. 9 depicts a block diagram of a processing system 900 for implementing the techniques described herein. In examples, processing system 900 has one or more central processing units ("processors" or "processing resources") 921a, 921b, 921c, etc. (collectively or generically referred to as processor(s) 921 and/or as processing device(s)). In aspects of the present disclosure, each processor 921 can include a reduced instruction set computer (RISC) microprocessor. Processors 921 are coupled to system memory (e.g., random access memory (RAM) 924) and various other components via a system bus 933. Read only memory (ROM) 922 is coupled to system bus 933 and may include a basic input/output system (BIOS), which controls certain basic functions of processing system 900.

Further depicted are an input/output (I/O) adapter 927 and a network adapter 926 coupled to system bus 933. I/O adapter 927 may be a small computer system interface (SCSI) adapter that communicates with a hard disk 923 and/or a storage device 925 or any other similar component. I/O adapter 927, hard disk 923, and storage device 925 are collectively referred to herein as mass storage 934. Operating system 940 for execution on processing system 900 may be stored in mass storage 934. The network adapter 926 interconnects system bus 933 with an outside network 936 enabling processing system 900 to communicate with other such systems.

A display (e.g., a display monitor) 935 is connected to system bus 933 by display adapter 932, which may include a graphics adapter to improve the performance of graphics intensive applications and a video controller. In one aspect of the present disclosure, adapters 926, 927, and/or 932 may be connected to one or more I/O busses that are connected to system bus 933 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 933 via user interface adapter 928 and display adapter 932. A keyboard 929, mouse 930, and speaker 931 may be interconnected to system bus 933 via user interface adapter 928, which may include, for example, a Super I/O chip integrating multiple device adapters into a single integrated circuit.

In some aspects of the present disclosure, processing system 900 includes a graphics processing unit 937. Graphics processing unit 937 is a specialized electronic circuit designed to manipulate and alter memory to accelerate the creation of images in a frame buffer intended for output to a display. In general, graphics processing unit 937 is very efficient at manipulating computer graphics and image processing, and has a highly parallel structure that makes it more effective than general-purpose CPUs for algorithms where processing of large blocks of data is done in parallel.

Thus, as configured herein, processing system 900 includes processing capability in the form of processors 921, storage capability including system memory (e.g., RAM 924), and mass storage 934, input means such as keyboard 929 and mouse 930, and output capability including speaker 931 and display 935. In some aspects of the present disclosure, a portion of system memory (e.g., RAM 924) and mass storage 934 collectively store the operating system 940 to coordinate the functions of the various components shown in processing system 900.

In addition, some embodiments described herein are associated with an "indication." As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining, and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, digital CPU devices, GPU devices, computing devices, microcontrollers, digital signal processors (DSPs), field programmable gate arrays (FPGAs), or like devices, as further described herein. A CPU typically performs a variety of tasks while a GPU is optimized to display or process images and/or 3D datasets.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The term "about" is intended to include the degree of error associated with measurement of the particular quantity based upon the equipment available at the time of filing the application. For example, "about" can include a range of ±8% or 5%, or 2% of a given value.

What is claimed is:

1. A method, comprising:
    capturing data about an environment, the data about the environment comprising at least one image captured using a camera and a point cloud captured using a three-dimensional coordinate measurement device;
    generating a database of two-dimensional (2D) features and associated three-dimensional (3D) coordinates based at least in part on the data about the environment by:
        performing feature extraction;
        determining a first 3D coordinate for a first feature of a plurality of features; and
        in response to determining that a second 3D coordinate cannot be determined for a second feature of the plurality of features using the data, determining the second 3D coordinate for the second feature of the plurality of features using photogrammetry;
    determining a position (x, y, z) and an orientation (pitch, roll, yaw) of a device within the environment based at least in part on the database of 2D features and associated 3D coordinates; and
    causing the device to display, on a display of the device, an augmented reality element at a predetermined location based at least in part on the position and the orientation of the device.

2. The method of claim 1, wherein the data about the environment comprises at least two images.

3. The method of claim 2, wherein generating the database of 2D features and associated 3D coordinates comprises performing photogrammetry using the at least two images.

4. The method of claim 1, wherein generating the database of 2D features and associated 3D coordinates comprises performing photogrammetry using at least one image.

5. The method of claim 1, wherein the data about the environment is captured using the camera.

6. The method of claim 1, wherein the data about the environment is captured using a three-dimensional scanner.

7. The method of claim 1, wherein the feature extraction is performed on the data about the environment.

8. The method of claim 7, wherein performing the feature extraction is based at least in part on at least one of an intensity image, a color image, and lidar depth data.

9. The method of claim 7, wherein generating the database of 2D features and associated 3D coordinates further comprises, subsequent to performing the feature extraction, using an extracted feature to estimate a 3D coordinate for the extracted feature.

10. The method of claim 1, wherein determining the position and the orientation of the device within the environment comprises:
receiving an image of the environment from the device;
extracting a 2D feature from the image; and
comparing the 2D feature to data stored in the database of 2D features and associated 3D coordinates to determine when a match exists.

11. The method of claim 10, wherein determining the position and the orientation of the device within the environment comprises:
responsive to determine that a match exists, creating a 3D reference point used for tracking using a 3D coordinate stored in the database of 2D features and associated 3D coordinates that is associated with the match; and
determining the position and the orientation of the device to track the device in the environment.

12. The method of claim 11, wherein the position and the orientation of the device within the environment is determined using at least one of relative orientation and space resection.

13. The method of claim 10, wherein determining the position and the orientation of the device within the environment comprises:
responsive to determine that a match does not exist, restarting the method.

14. The method of claim 1, further comprising:
identifying a difference between a feature captured by the device and a feature of the database of 2D features and associated 3D coordinates to identify a changed region within the environment; and
updating the database of 2D features and associated 3D coordinates based at least in part on the difference.

15. The method of claim 1, further comprising:
detecting a fiducial feature within the environment;
determining an expected location of the fiducial feature within the environment based at least in part on the database of 2D features and associated 3D coordinates; and
determining whether an actual location of the fiducial feature matches the expected location of the fiducial feature.

16. A system comprising:
a coordinate measurement device to capture data about an environment; and
a processing system comprising first processing circuitry to:
generate a database of 2D features and associated 3D coordinates based at least in part on the data about the environment;
determine a position and an orientation of a user device within the environment based at least in part on the database of 2D features and associated 3D coordinates;
identify a difference between a feature captured by the user device and a feature of the database of 2D features and associated 3D coordinates to identify a changed region within the environment; and
update the database of 2D features and associated 3D coordinates based at least in part on the difference; and
the user device comprising a display and second processing circuitry to:
display, on the display, an augmented reality element at a predetermined location based at least in part on the position and the orientation of the user device.

17. The system of claim 16, wherein determining the position and the orientation of the user device is further based at least in part on an image captured by a camera associated with the user device.

18. The system of claim 16, wherein the data about the environment are images of the environment, and wherein generating the database of 2D features and associated 3D coordinates based at least in part on the data about the environment is performed using photogrammetry.

19. The system of claim 16, wherein generating the database of 2D features and associated 3D coordinates based at least in part on the data about the environment comprises performing feature extraction.

20. The system of claim 16, wherein the data about the environment is captured using a laser scanner.

21. A method, comprising:
capturing data about an environment;
generating a database of two-dimensional (2D) features and associated three-dimensional (3D) coordinates based at least in part on the data about the environment;
determining a position (x, y, z) and an orientation (pitch, roll, yaw) of a device within the environment based at least in part on the database of 2D features and associated 3D coordinates by:
receiving an image of the environment from the device;
extracting a 2D feature from the image;
comparing the 2D feature to data stored in the database of 2D features and associated 3D coordinates to determine when a match exist;
responsive to determine that a match exists, creating a 3D reference point used for tracking using a 3D coordinate stored in the database of 2D features and associated 3D coordinates that is associated with the match; and
determining the position and the orientation of the device to track the device in the environment; and
causing the device to display, on a display of the device, an augmented reality element at a predetermined location based at least in part on the position and the orientation of the device.

* * * * *